Sept. 23, 1952 D. WEIGHTON 2,611,823

ARRANGEMENT FOR SUPPRESSING IMPULSIVE INTERFERENCE IN THE RECEPTION OF AMPLITUDE MODULATED SIGNALS

Filed Oct. 24, 1946

Inventor

By Donald Weighton

Emery, Holcombe & Blair

Attorney

Patented Sept. 23, 1952 2,611,823

UNITED STATES PATENT OFFICE 2,611,823

ARRANGEMENT FOR SUPPRESSING IMPULSIVE INTERFERENCE IN THE RECEPTION OF AMPLITUDE MODULATED SIGNALS

Donald Weighton, Cambridge, England, assignor to Pye Limited, Cambridge, England, a British company Application October 24, 1946, Serial No. 705,406
In Great Britain October 24, 1945

4 Claims. (Cl. 178—44)

The present invention relates to an arrangement for suppressing impulsive interference in the reception of amplitude modulated signals, and is particularly suitable for suppressing interference caused in radio reception of amplitude modulated signals by internal combustion engines and some other sources which produce interference signals consisting of repeated pulses of very short duration. Since the slope of such interfering pulses is much steeper than the slope of the amplitude modulated signals, they may be suppressed by a limiting circuit which operates when the rate of change of signal exceeds some predetermined value, and the present invention has for an object to provide a simple limiting circuit for suppressing the interference which operates on this principle.

To this end, the present invention consists in a circuit arrangement comprising a series connected non-linear element associated with a circuit having such a time constant that, if the rate of rise of potential exceeds a value determined by the amplitude and maximum frequency of the signal which it is desired to receive, the non-linear element ceases to conduct and suppresses the interfering impulse. Preferably, the circuit consists essentially of a series connected diode or other non-linear element having provision for a direct current to be passed therethrough, a resistor and condenser or coil and condenser arrangement having the predetermined time constant being connected to the output electrode, which may be either the anode or cathode according to the sign of the interfering impulse.

Since the limiting circuit operates when the rate of change of signal exceeds the predetermined value, the level at which the interfering impulse is suppressed may be made less than the maximum amplitude which it is desired to receive.

In order that the invention may be more clearly understood, reference will now be made to the accompanying drawings, in which Fig. 1 shows a circuit arrangement for the suppression of positive interfering impulses.

Figure 1:
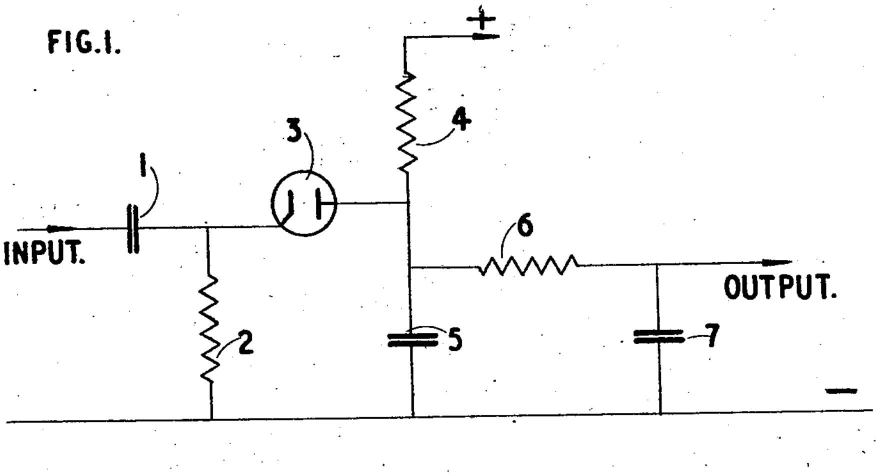

One embodiment of the invention is illustrated in Fig. 1 where the circuit is arranged for the suppression of positive interfering impulses. A small direct current is passed through the diode 3 from a source of positive potential via the resistors 4 and 2, and the incoming signal together with the interfering impulse is fed through the condenser 1 to the cathode of the diode 3. The resistor 4 and condenser 5 are selected to have a time constant such that the rate of rise of potential at the anode of the diode may not exceed a value which will be determined by the amplitude and the maximum frequency of the signal which it is desired to receive. The diode therefore remains conducting except for the duration of the interfering impulse when the cathode potential rises steeply and the valve is cut off. During this interval the potential of the diode anode rises slowly at a rate determined by the resistor 4 and condenser 5 but falls again sharply when the diode becomes conducting at the end of the interfering impulses. The amplitude of the disturbance at this point may therefore be less than that of the signal and will be independent of the amplitude of the original impulse. The filter section comprising the resistor 6 and condenser 7 may be added to improve still further the ratio of signal to interference.

Figure 2:
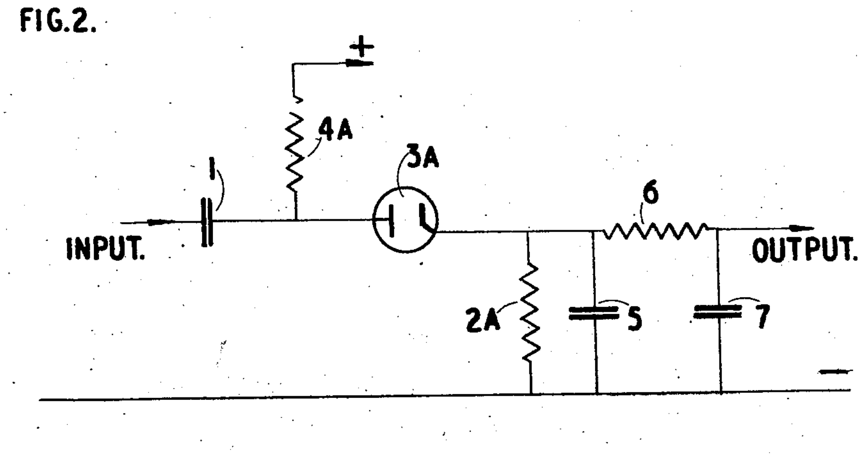
Fig. 2 shows a circuit arrangement for the suppression of negative interfering impulses.

Fig. 2 shows an embodiment of the invention in which the circuit is arranged to suppress negative interfering impulses. In this embodiment the signal input is fed via the condenser 1 to the anode of the diode *3a*. The direct current is passed through the diode from the source of positive potential via the resistances *4a* and *2a*. The circuit operates on the same principles as the circuit of Fig. 1.

Figure 3:
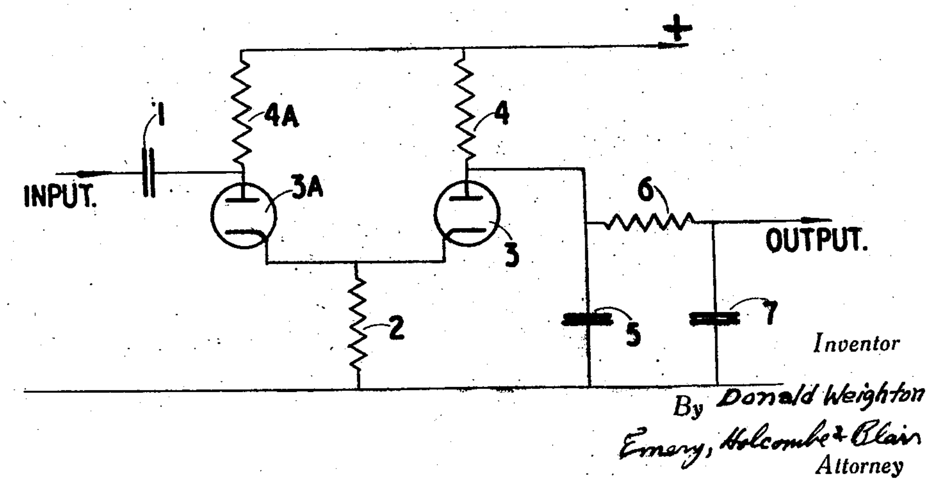
Fig. 3 shows a circuit arrangement for suppressing both positive and negative interfering impulses.

Fig. 3 shows one method of combining the circuits of Figs. 1 and 2 so that suppression is effective for both positive and negative pulses. The arrangement is particularly useful when the interfering pulse shows appreciable overshoot due to ringing or blocking of the receiver amplifier on overload. The circuit elements are numbered to correspond with the circuit elements of Figs. 1 and 2.

I claim:

1. Circuit arrangement for suppressing impulsive interference of positive sign in the reception of amplitude modulated signals, comprising a diode, a steady source of direct current potential connected to feed a small direct current through the diode, means for feeding the input signal to the cathode of the diode, a resistor connected in the direct current supply lead to the anode of the diode, and a condenser connected between said anode and the negative pole of the direct current source said resistor and condenser having such a time constant that the rate of rise of potential at the anode of the diode cannot exceed a value which is determined by the amplitude and the maximum frequency of the signal which is desired to receive.

2. Circuit arrangement for suppressing impulsive interference of negative sign in the reception of amplitude modulated signals, comprising a diode, a steady source of direct current potential connected to feed a small direct current through the diode, means for feeding the input signal to the anode of the diode, a resistor connected in the direct current supply lead to said anode, and a condenser, connected between the cathode of said diode and the negative pole of the direct current source, a second resistor connected across said condenser, said second resistor and condenser having such a time constant that the rate of rise of potential at the cathode of the diode cannot exceed a value which is determined by the amplitude and the maximum frequency of the signal which is desired to receive.

3. Circuit arrangement for suppressing impulsive interference in the reception of amplitude modulated signals, comprising a pair of diodes, a source of direct current, resistors connected between the anodes of said diodes and the positive pole of the source of direct current, a resistor connected between the cathodes of said diodes and the negative pole of the source of direct current, means for feeding the signal input to the anode of one of said diodes, a condenser directly shunted between the anode of the other of said diodes and the negative pole of the direct current source, and means for deriving the output signal from across said condenser, the arrangement being such that the rate of rise of potential across said condenser cannot exceed a value which is determined by the amplitude and the maximum frequency of the signal which it is desired to receive.

4. The method of eliminating impulsive interference of definite sign in amplitude modulated radio signals, in a circuit comprising a diode rendered normally conducting by applying the positive pole of a direct current source to the anode of said diode and the negative pole of the direct current source to the cathode of said diode, which method comprises the steps of passing said signal through said diode by way of the electrode opposite in sign to the impulsive interference to be suppressed, and conducting said signal from said diode directly into a circuit having a time constant such that only impulsive interference of which the rate of rise of potential exceeds that obtained with the signal biases said diode to a non-conducting portion of its characteristic.

DONALD WEIGHTON.

REFERENCES CITED

The following references are of record in the file of this patent:

UNITED STATES PATENTS

| Number | Name | Date |
|---|---|---|
| 2,224,794 | Montgomery | Dec. 10, 1940 |
| 2,281,395 | Travis | Apr. 28, 1942 |
| 2,299,391 | Holmes | Oct. 20, 1942 |
| 2,300,115 | Grundmann | Oct. 27, 1942 |
| 2,345,762 | Martinelli | Apr. 4, 1944 |
| 2,418,389 | Andresen | Apr. 1, 1947 |

OTHER REFERENCES

Radar Electronic Fundamentals, Published in June 1944 by NAVSHIPS 900,016 by Navy Dept. Washington D. C. (Copy in Patent Office Library August 7, 1946.)